(12) United States Patent
Nakajima et al.

(10) Patent No.: US 6,765,630 B2
(45) Date of Patent: Jul. 20, 2004

(54) DISPLAY PANEL

(75) Inventors: Mutsumi Nakajima, Nara (JP); Kazuko Nakajima, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/351,362

(22) Filed: Jan. 27, 2003

(65) Prior Publication Data

US 2003/0112402 A1 Jun. 19, 2003

Related U.S. Application Data

(62) Division of application No. 09/047,509, filed on Mar. 25, 1998, now Pat. No. 6,570,630.

(30) Foreign Application Priority Data

Mar. 26, 1997 (JP) .............................. 9-073963

(51) Int. Cl.⁷ ............................. G02F 1/1333

(52) U.S. Cl. ........................ 349/40; 349/139

(58) Field of Search .................... 349/40, 139; 324/770

(56) References Cited

U.S. PATENT DOCUMENTS

| | | |
|---|---|---|
| 4,803,536 A | 2/1989 | Tuan |
| 5,068,748 A | 11/1991 | Ukai et al. |
| 5,313,319 A | 5/1994 | Salisbury |
| 5,327,267 A | 7/1994 | Aoki et al. |
| 5,471,329 A | 11/1995 | Nakajima et al. |
| 5,497,146 A | 3/1996 | Hebiguchi et al. |

(List continued on next page.)

FOREIGN PATENT DOCUMENTS

| | | |
|---|---|---|
| EP | 0 423 824 A2 | 4/1991 |
| EP | 0 845 697 A1 | 6/1998 |
| JP | 59-126663 A | 7/1984 |
| JP | 63-10558 A | 1/1988 |
| JP | 63-220289 A | 9/1988 |
| JP | 4-130417 A | 5/1992 |
| JP | 07-225393 | 8/1995 |
| JP | 8-101397 | 4/1996 |
| JP | 08-179366 | 7/1996 |
| WO | 97/06465 | 2/1997 |

OTHER PUBLICATIONS

U.S. patent application Ser. No. 09/047,509 filed Mar. 25, 1998.

European Search Report dated Sep. 7, 1999.

(List continued on next page.)

*Primary Examiner*—Kenneth Parker
(74) *Attorney, Agent, or Firm*—Nixon & Vanderhye P.C.

(57) ABSTRACT

A display panel of the present invention includes: a first substrate and a second substrate opposing each other with a display medium interposed therebetween; a plurality of signal lines and a plurality of scanning lines provided on the first substrate to cross each other and be insulated from each other; and a plurality of pixel electrodes each provided in a vicinity of an intersection between one of the plurality of signal lines and one of the plurality of scanning lines so as to be connected to the one of the plurality of signal lines and the one of the plurality of scanning lines via a switching element, while the plurality of pixel electrodes define a display region of the display panel. At least one of each of the plurality of signal lines and each of the plurality of scanning lines has a high resistance portion proximate an end thereof outside the display region. The high resistance portion is interposed at least partially between the first substrate and the second substrate.

6 Claims, 7 Drawing Sheets

U.S. PATENT DOCUMENTS

| | | | |
|---|---|---|---|
| 5,504,348 A | | 4/1996 | Yoshida et al. |
| 5,677,745 A | * | 10/1997 | Kawano et al. ............... 349/42 |
| 5,731,216 A | | 3/1998 | Holmberg et al. |
| 5,767,929 A | | 6/1998 | Yachi et al. |
| 5,781,253 A | | 7/1998 | Koike et al. |
| 5,852,480 A | | 12/1998 | Yajima et al. |
| 5,909,035 A | | 6/1999 | Kim |
| 5,946,057 A | | 8/1999 | Kusanagi |
| 5,949,502 A | | 9/1999 | Matsunaga et al. |
| 6,005,647 A | | 12/1999 | Lim |
| 6,239,850 B1 | | 5/2001 | Ohori et al. |

OTHER PUBLICATIONS

Patent Abstracts of Japan (English Translation of 8 101397), Apr. 16, 1996, NEC Corp., Shimizu Takeya, "Thin Film Transistor Liquid Crystal Display Device and Its Manufacture".

NE 9301406 (counterpart to above–listed US 5,504,348.

Japanese Office Action dated May 6, 2003.

U.S. patent application Ser. No. 10/351,388 filed Jan. 27, 2003.

* cited by examiner

DISPLAY PANEL

This application is a Divisional of application Ser. No. 09/047,509, filed Mar. 25, 1998, now U.S. Pat. No. 6,570,630 the entire content of which is hereby incorporated by reference in this application.

BACKGROUND OF THE INVENTION

1. Field of the Invention

The present invention relates to a display panel such as a liquid crystal display panel used in television sets, personal computers, word processors, OA (Office Automation) apparatuses, or the like.

2. Description of the Related Art

Such a liquid crystal display panel has a structure where a pair of substrates are provided so as to oppose each other with a liquid crystal layer being interposed therebetween as a display medium. One of the pair of substrates is an active matrix substrate, in which a plurality of signal lines and a plurality of scanning lines are provided so as to cross each other via an insulation film. A pixel electrode is provided in the vicinity of an intersection between the signal line and the scanning line and is connected to the signal lines and the scanning lines via a TFT (Thin Film Transistor) as a switching element. Each of the pixel electrodes is provided with a signal from the corresponding signal line via the TFT, which is switched by a signal from the corresponding scanning line. Thus, a voltage is applied to the liquid crystal layer between the pixel electrode and an opposing counter electrode, thereby changing the optical characteristics of the corresponding portion of the liquid crystal layer between the electrodes. This change in the optical characteristics is visually perceived as a display pattern.

When a voltage of, for example, about 100 V or more generated by an electrostatic charge, or the like, is applied to the signal line or the scanning line, the characteristics of the TFT may deteriorate, or the insulation film between the signal line and the scanning line may be broken. In such a case, a linear defect or a display non-uniformity may appear in a displayed image, thus lowering the display quality. Since an electrostatic charge of such a magnitude often occurs during a step of producing the active matrix substrate or a step of rubbing an alignment film for aligning the liquid crystal layer, it is impossible to completely avoid such problems as described above.

In view of this, an active matrix substrate provided with a short-circuiting line, as shown in FIGS. 7 and 8, has been conventionally used.

FIG. 7 shows an equivalent circuit of such a conventional active matrix substrate 101. The active matrix substrate 101 includes a transmissive substrate 1 made of a glass plate, or the like, as well as a plurality of signal lines 2 and a plurality of scanning lines 3 provided to cross each other via an insulation film. The active matrix substrate 101 further includes TFTs 4 in the vicinity of the intersection between the signal lines 2 and the scanning lines 3 as switching elements, and pixel electrodes 5. A display region is defined by the plurality of pixel electrodes 5 arranged in a matrix. Each of the pixel electrodes 5 is connected to a corresponding TFT 4. The signal lines 2 and the scanning lines 3 extend beyond the display region. A signal input terminal 6 is provided at one end of each signal line 2 while a signal input terminal 7 is provided at one end of each scanning line 3. Furthermore, a short-circuiting line 8 is formed around the display region. Until a certain point in the production process, the short-circuiting line 8 is connected to both ends of the signal lines 2 and the scanning lines 3.

FIG. 8 is a plan view illustrating another conventional active matrix substrate 111. Elements in FIG. 8 which are functionally the same as those in FIG. 7 are denoted by the same reference numerals and will not be further described. In FIG. 8, for simplicity, elements provided inside a display region 20 and some of the lines and terminals provided around the display region 20 are not shown. In this active matrix substrate, the short-circuiting line 8 is connected to one end of each signal line 2 at which the signal input terminal 6 is not provided and to one end of each scanning line 3 at which the signal input terminal 7 is not provided.

Such an active matrix substrate is attached to a counter substrate having a transmissive substrate and counter electrodes provided thereon. Then, a liquid crystal material is injected between the substrates, thereby completing the liquid crystal display panel. Herein, the panel cannot be driven with the signal lines 2 and the scanning lines 3 being short-circuited by the short-circuiting line 8. Therefore, the short circuit is removed before the liquid crystal panel is completed by severing the substrate 111 along a severance line 10.

As described above, the short-circuiting line 8 is provided to connect the signal lines 2 and the scanning lines 3 to one another, whereby the signal lines 2 and the scanning lines 3 are always kept at the same potential. Thus, it is possible to prevent the deterioration of the TFT characteristics and the insulation breakdown between the signal lines 2 and the scanning lines 3, even if an electrostatic charge is applied during a step of producing the liquid crystal display panel.

However, in the structures illustrated in FIGS. 7 and 8, the signal lines 2 and the scanning lines 3 are electrically isolated from one another after the active matrix substrate is severed. Thus, it is not possible to prevent the deterioration of the TFT characteristics and the insulation breakdown between the signal lines 2 and the scanning lines 3 due to an electrostatic charge generated during steps after the severance step. Moreover, even after the liquid crystal display panel is completed, the TFT, whose characteristics can deteriorate even by an applied voltage of about 100 V, is always subject to an influence of an electrostatic charge until it is incorporated in a shield case. For example, the TFT is subject to the influence of an electrostatic charge during steps of connecting drivers to the panel, attaching a polarizer thereto, and incorporating the panel into a shield case. Thus, it is very difficult in practice to completely prevent an electrostatic charge of such a magnitude from being generated and influencing the TFTs.

Furthermore, in the structure illustrated in FIG. 7, after the severance, each edge of the substrate 101 includes severed sections of the signal lines 2 or the scanning lines 3. In the structure illustrated in FIG. 8, two edges of the counter substrate (e.g., the upper and left edges, as in FIG. 8), along which the signal input terminals 6 or 7 are not provided, will have severed sections of either the signal lines 2 or the signal lines 3 after the severance. An electrostatic charge entering the panel through these severed sections often causes a problem, thereby significantly lowering the product yield.

Moreover, in the structures illustrated in FIGS. 7 and 8, until the active matrix substrate is severed and the short circuit by the short-circuiting line 8 is removed, all the signal lines 2 and the scanning lines 3 are short-circuited, whereby it is not possible to conduct a test for detecting a short circuit between the signal lines 2 and the scanning lines 3 or for detecting a disconnection of the lines.

In view of this, another type of conventional active matrix substrate 121 is known, which includes elements 12 and inner short-circuiting line 13, as shown in FIG. 9.

FIG. 9 shows an equivalent circuit of such a conventional active matrix substrate 121. Elements in FIG. 9 which are functionally the same as those in FIG. 7 are denoted by the same reference numerals and will not be further described. In this active matrix substrate 121, the inner short-circuiting line 13 is separately provided inside the short-circuiting line 8, where the signal lines 2 and the scanning lines 3 are connected to the inner short-circuiting line 13 via the elements 12. As the element 12, a high resistance element made of a semiconductor thin film, or the like, or a non-linear element which exhibits non-linear resistance values for different applied voltages may be used.

In this structure, even after the active matrix substrate 121 is severed along the severance line 10 so as to disconnect the signal lines 2 and the scanning lines 3 from the short-circuiting line 8, there still remain connections of the signal lines 2 and the scanning lines 3 with the inner short-circuiting line 13. Thus, even when an electrostatic charge is applied during steps after the substrate is severed, the electric charge is dispersed to all of the signal lines 2 and the scanning lines 3 via the elements 12 and the inner short-circuiting line 13. Thus, it is possible to prevent the deterioration of the TFT characteristics and the insulation breakdown between the signal lines 2 and the scanning lines 3. Herein, the connection resistance between the signal lines 2 and the inner short-circuiting line 13, and between the scanning lines 3 and the inner short-circuiting line 13, is set to a value which is sufficiently high to eliminate problems in conducting a test for detecting a short circuit between the signal lines 2 and the scanning lines 3, for detecting a disconnection of the lines during the production process of the liquid crystal display panel, or in actually driving the completed liquid crystal display panel.

In the conventional examples illustrated in FIGS. 7 and 8, after the active matrix substrate is severed and the short circuit between the signal and scanning lines 2 and 3 and the short-circuiting line 8 is removed, each of the signal lines 2 and the scanning lines 3 is electrically isolated from one another. Therefore, when an electrostatic charge is applied after the substrate is severed, it is not possible to prevent the deterioration of the switching element characteristics and the insulation breakdown between the signal lines 2 and the scanning lines 3. Moreover, as the substrate edges have severed sections of the signal lines 2 or the scanning lines 3, an electrostatic charge entering the panel through these severed sections often causes a problem. Furthermore, until the active matrix substrate is severed and the short circuit by the short-circuiting line 8 is removed, all the signal lines 2 and the scanning lines 3 are electrically connected to each other, whereby it is not possible to conduct a test for detecting a short circuit between the signal lines 2 and the scanning lines 3 nor detect a disconnection of the lines.

In the conventional example illustrated in FIG. 9, the elements 12 may be broken or the characteristics thereof may deteriorate due to an applied electrostatic charge, so that leakage might occur between the signal lines 2 and the scanning lines 3, or non-uniformity may occur in the connection resistance between the lines and the inner short-circuiting line 13, thus lowering the display quality. Moreover, the resistance of the elements 12 is set to a value which is sufficiently high to eliminate problems in actually driving the display panel. Normally, the resistance value of the elements 12 is set to be higher than the resistance value of the signal lines 2 and the scanning lines 3 by an order of magnitude or more. Therefore, when an electrostatic charge is applied through the severed edge (such as C in FIG. 9), most of the electric charge flows to the signal lines 2 or the scanning lines 3 due to the resistance difference. Thus, substantially no electric charge is dispersed to the inner short-circuiting line 13 via the elements 12, whereby the characteristics of the TFTs 4 connected to the signal lines 2 or the scanning lines 3 may deteriorate, or the insulation between the lines may be broken.

SUMMARY OF THE INVENTION

According to one aspect of this invention, a display panel includes: a first substrate and a second substrate opposing each other with a display medium interposed therebetween; a plurality of signal lines and a plurality of scanning lines provided on the first substrate to cross each other and be insulated from each other; and a plurality of pixel electrodes each provided in a vicinity of an intersection between one of the plurality of signal lines and one of the plurality of scanning lines so as to be connected to the one of the plurality of signal lines and the one of the plurality of scanning lines via a switching element, while the plurality of pixel electrodes define a display region of the display panel. At least one of each of the plurality of signal lines and each of the plurality of scanning lines has a high resistance portion proximate an end thereof outside the display region. The high resistance portion is interposed at least partially between the first substrate and the second substrate.

In one embodiment of the invention, the high resistance portion is formed of a material including semiconductor, a metal, and a metal oxide.

In another embodiment of the invention, the high resistance portion is formed of a film having a specific resistance higher than a specific resistance of a film which forms portions of the plurality of signal lines and the plurality of the scanning lines in the display region.

According to another aspect of this invention, a display panel includes: a first substrate and a second substrate opposing each other with a display medium interposed therebetween; a plurality of signal lines and a plurality of scanning lines provided on the first substrate to cross each other and be insulated from each other; and a plurality of pixel electrodes each provided in a vicinity of an intersection between one of the plurality of signal lines and one of the plurality of scanning lines so as to be connected to the one of the plurality of signal lines and the one of the plurality of scanning lines via a switching element, while the pixel electrodes define a display region of the display panel. A first electrode, for inducing an electrostatic charge applied to the display panel to the first electrode, is provided outside the display region in a vicinity of an end of at least one of each of the plurality of signal lines and each of the plurality of scanning lines, the first electrode being insulated from the plurality of signal lines and the plurality of scanning lines.

In one embodiment of the invention, the first electrode is electrically connected to a counter electrode on the second substrate.

In another embodiment of the invention, the first electrode is superimposed on, and insulated from, the plurality of signal lines and the plurality of scanning lines.

In still another embodiment of the invention, the first electrode is interposed between, and insulated from, two adjacent ones of the plurality of signal lines and the plurality of scanning lines.

In still another embodiment of the invention, the first electrode is wider or larger in area than the portion of the plurality of signal lines and the plurality of scanning lines near an edge of the first substrate.

Hereinafter, the effect of the present invention will be described.

In the present invention, the signal line and/or the scanning line has a high resistance portion proximate the end thereof outside the display region. Since the signal lines and the scanning lines are connected to the short-circuiting line via the high resistance portions, even if an electrostatic charge is applied before the substrate is severed, the electrostatic charge can be dispersed to the other lines via the high resistance portion and the short-circuiting line, whereby the deterioration of the switching element characteristics and the insulation breakdown between the lines will not occur due to an electrostatic charge. Moreover, since the resistance value of the high resistance portion is sufficiently higher than the resistance value of the signal line or the scanning line, it is possible to conduct a test for detecting a disconnection of the signal lines and the scanning lines or for detecting a leakage between these lines, with the connection of these lines to the short-circuiting line still intact.

Moreover, the high resistance portion is protruding from, or interior to, an edge of the counter substrate, whereby when the substrate is severed, part or all of the high resistance portion remains between the severed edge of the substrate and the display region. Thus, even when a static electric charge is applied during steps after the substrate is severed, the voltage of the applied electrostatic charge is lowered by the high resistance portion before it reaches the display region, whereby the deterioration of the switching element characteristics and the insulation breakdown between the lines will not occur. Furthermore, since the high resistance portion is located closer to the substrate edge than the signal input terminals, the high resistance portion does not influence a signal applied to the signal input terminals for actually driving the display panel, even with the high resistance portion remaining on the substrate after the display panel is completed.

It is preferable that the high resistance portion is made of a film having a specific resistance higher than a specific resistance of a film which forms portions of the signal lines and the scanning lines excluding the high resistance portion. Any film such as a semiconductor film, a metal film or a metal oxide film may be used for this purpose. Particularly, it is preferable that the high resistance portion is formed of a material which forms the active matrix substrate, whereby no additional production step is required.

According to an alternative example of the present invention, a discharge-inducing electrode is provided outside the display region in the vicinity of the end of either or both of the signal line and the scanning line so as to be insulated from these lines. Therefore, even when an electrostatic charge is generated around the display panel during a step of producing the display panel or after the display panel is completed, the electrostatic charge is discharged to the discharge-inducing electrode, whereby the application of the electrostatic charge to the signal lines and the scanning lines is suppressed. Thus, the deterioration of the switching element characteristics and the insulation breakdown between the lines will not occur.

When the discharge-inducing electrode is connected to the counter electrode, the applied electrostatic charge is dispersed to the entire display panel, whereby it is possible to avoid the influence of the electrostatic charge.

The discharge-inducing electrode may be superimposed on, and insulated from, the scanning lines and the signal lines, or it may be interposed between, and insulated from, two adjacent signal lines or two adjacent scanning lines. The discharge-inducing electrode may further be provided outside the outermost lines so as to be insulated from the outermost lines. In any case, since the discharge-inducing electrode is electrically insulated from the lines, the electrostatic charge applied to the discharge-inducing electrode will not be applied to the scanning lines or the signal lines.

The discharge-inducing electrode is preferably wider or larger in area than the scanning lines or the signal lines at the edge of the substrate, so that the electrostatic charge applied around the display panel is more easily induced to the discharge-inducing electrode.

Thus, the invention described herein has the advantage of providing a display panel in which it is possible to prevent the deterioration of the switching element characteristics and the insulation breakdown between the lines due to an electrostatic charge even after the substrate is severed.

This and other advantages of the present invention will become apparent to those skilled in the art upon reading and understanding the following detailed description with reference to the accompanying figures.

DESCRIPTION OF THE PREFERRED EMBODIMENTS

Figure 1:
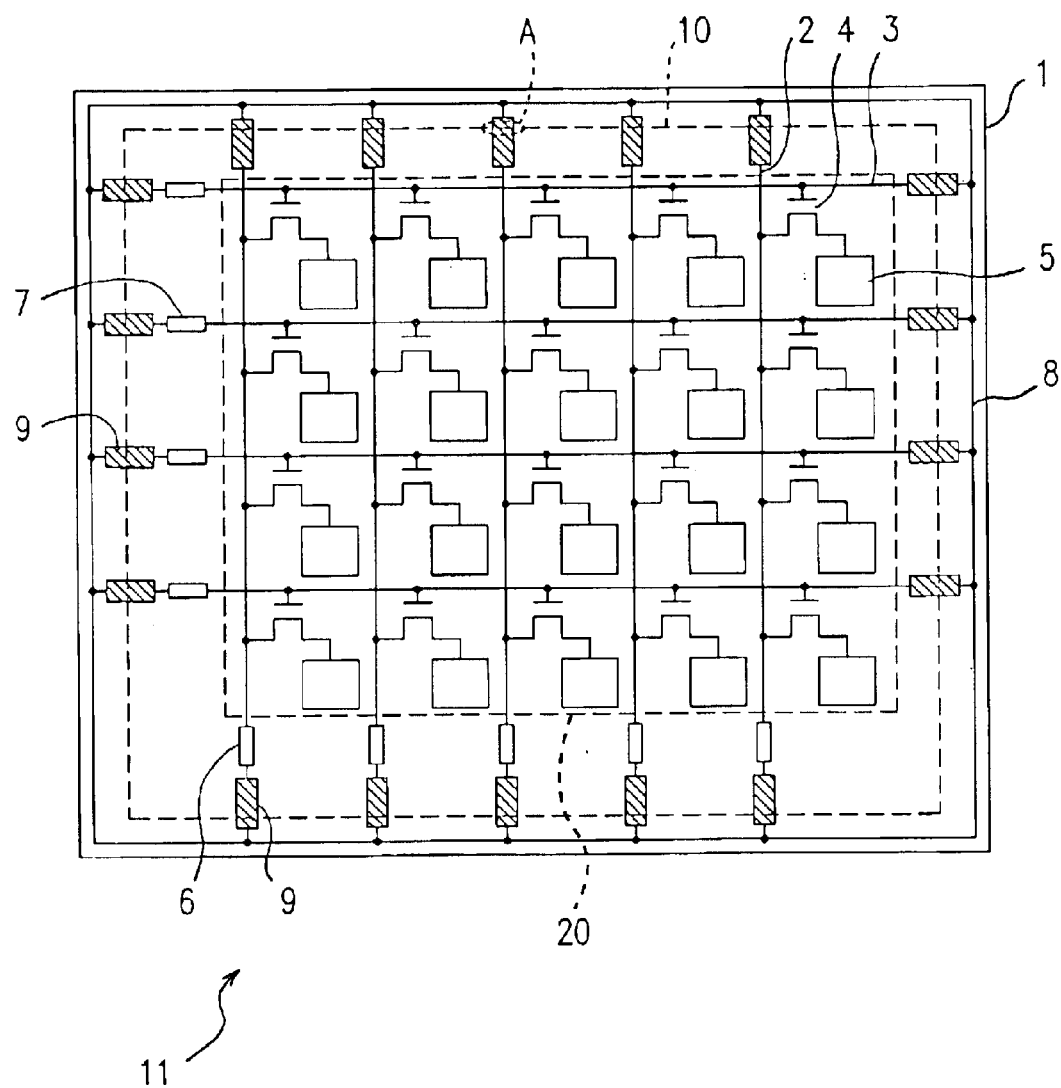
FIG. 1 is a diagram illustrating an equivalent circuit of an active matrix substrate in a display panel according to Example 1 of the present invention.

Hereinafter, the present invention will be described by way of illustrative examples with reference to the accompanying figures. In the figures for illustrating the examples of the present invention, elements which are functionally the same as those in the conventional examples are denoted by the same reference numerals.

EXAMPLE 1

FIG. 1 shows an equivalent circuit of an active matrix substrate 11 in a display panel according to Example 1 of the present invention.

The active matrix substrate 11 includes a transmissive substrate 1 made of a glass plate, or the like, as well as a plurality of signal lines 2 and a plurality of scanning lines 3 provided to cross each other via an insulation film (not shown). The active matrix substrate 11 further includes TFTs 4 in the vicinity of the intersection between the signal lines 2 and the scanning lines 3 as switching elements, and pixel electrodes 5. A display region 20 is defined by the plurality of pixel electrodes 5 provided in a matrix arrangement. Each of the pixel electrodes 5 is connected to a corresponding TFT 4. The signal lines 2 and the scanning lines 3 extend beyond the display region 20. A signal input terminal 6 is provided at one end of the signal line 2 while a signal input terminal 7 is provided at one end of the scanning line 3. Each of the pixel electrodes 5 is provided with a signal from the corresponding signal line 2 via the TFT 4, which is switched by a signal from the corresponding scanning line 3.

Furthermore, a short-circuiting line 8 is formed around the display region 20. The short-circuiting line 8 is connected to high resistance portions 9 provided at both ends of the signal lines 2 and the scanning lines 3. The high resistance portions 9 can be formed simultaneously with the TFTs 4 using, for example, an $n^+$ a-Si semiconductor film, which forms the TFTs 4. The specific resistance of $n^+$ a-Si is usually about several tens $\Omega$cm, and the thickness thereof is about several hundred angstroms. When the specific resistance of $n^+$ a-Si is about 100 M$\Omega$/□, the width of the high resistance portions 9 about 100 $\mu$m, and the length thereof about 10 $\mu$m, then, the connection resistance between the signal lines 2 or the scanning lines 3 and the short-circuiting line 8 is about 10 M$\Omega$.

Figure 2:
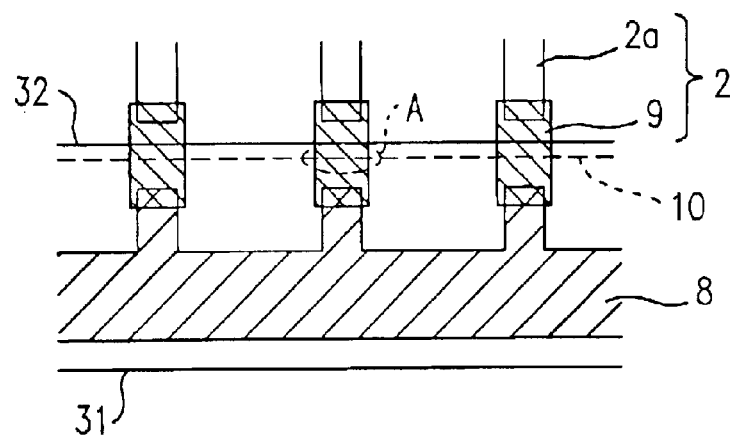
FIG. 2 is a partial enlarged view illustrating a display panel according to Example 1 of the present invention.
Figure 3:
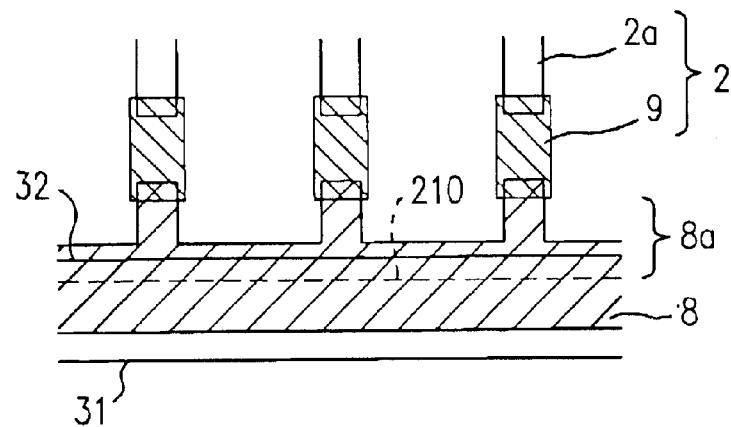
FIG. 3 is a partial enlarged view illustrating a display panel according to Example 2 of the present invention.
Figure 4:
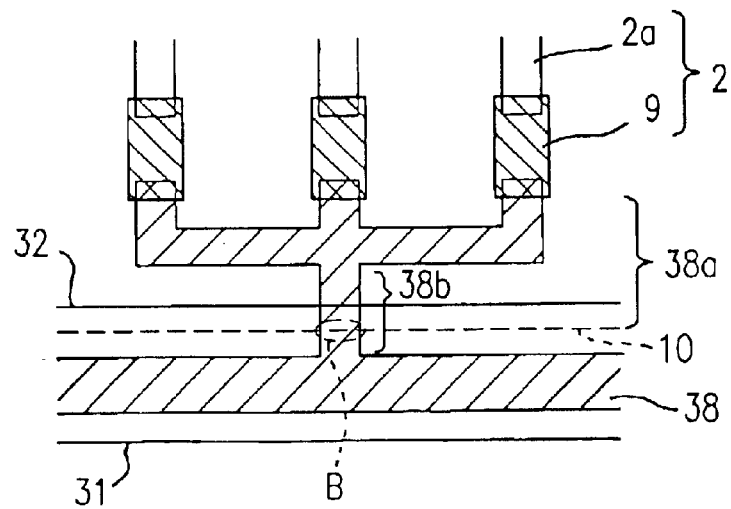
FIG. 4 is a partial enlarged view illustrating a display panel according to Example 3 of the present invention.

To complete a display panel, the active matrix substrate 11 is attached to a counter substrate (not shown) having a transmissive substrate and planar counter electrodes provided thereon. FIG. 2 is an enlarged view showing a portion of the display panel corresponding to the upper portion of the active matrix substrate 11 of FIG. 1, before the active matrix substrate is severed. After the attachment of the active matrix substrate 11 and the counter substrate, the substrate 11 is severed along a severance line 10, as shown in FIGS. 1 and 2, so as to remove the portion on which the short-circuiting line 8 is provided. A part of the high resistance portion 9 remains at both ends of the signal lines 2 (and the scanning lines 3). In FIGS. 2, 3 and 4, reference numeral 31 denotes an edge of the substrate 11 before it is severed, and reference numeral 32 denotes an edge of the counter substrate.

As shown in FIG. 2, the edge 32 of the counter substrate is preferably positioned so that the counter substrate completely covers the signal line portions 2a (and the scanning line portions), while it does not completely cover the high resistance portions 9. Then, the gap between the active matrix substrate and the counter substrate is filled with a liquid crystal material, thereby completing the liquid crystal display panel.

In the display panel, all the signal lines 2 and the scanning lines 3 are connected to the short-circuiting line 8 via the high resistance portions 9, until the active matrix substrate 11 is severed. Therefore, even when an electrostatic charge is generated during steps before the substrate 11 is severed, the applied electric charge is dispersed to all the lines via the high resistance portions 9 and the short-circuiting line 8, whereby the deterioration of the switching element characteristics and the insulation breakdown between the lines will not occur. Moreover, the line resistance value of the signal line portion 2a (and the scanning line portion) is normally about 1 to several tens k$\Omega$, and sufficiently lower than the resistance value of the high resistance portion 9. Therefore, it is possible to conduct a substrate test for detecting a disconnection of the lines or for detecting a leakage between the lines.

During steps after the active matrix substrate 11 is severed, the surface of the active matrix substrate 11 is covered with the counter substrate except for the portion where the signal input terminals 6 and 7 are formed. Therefore, a generated electrostatic charge mostly enters the signal lines 2 and the scanning lines 3 through the severed substrate edges (such as A in FIGS. 1 and 2). However, since the high resistance portion 9 exists between the signal line 2 and the severed edge and between the scanning line 3 and the severed edge, the voltage of the applied electrostatic charge is lowered by the high resistance portion 9 before it reaches the display region 20, whereby the deterioration of the switching element characteristics and the insulation breakdown between the lines will not occur.

Figure 9:
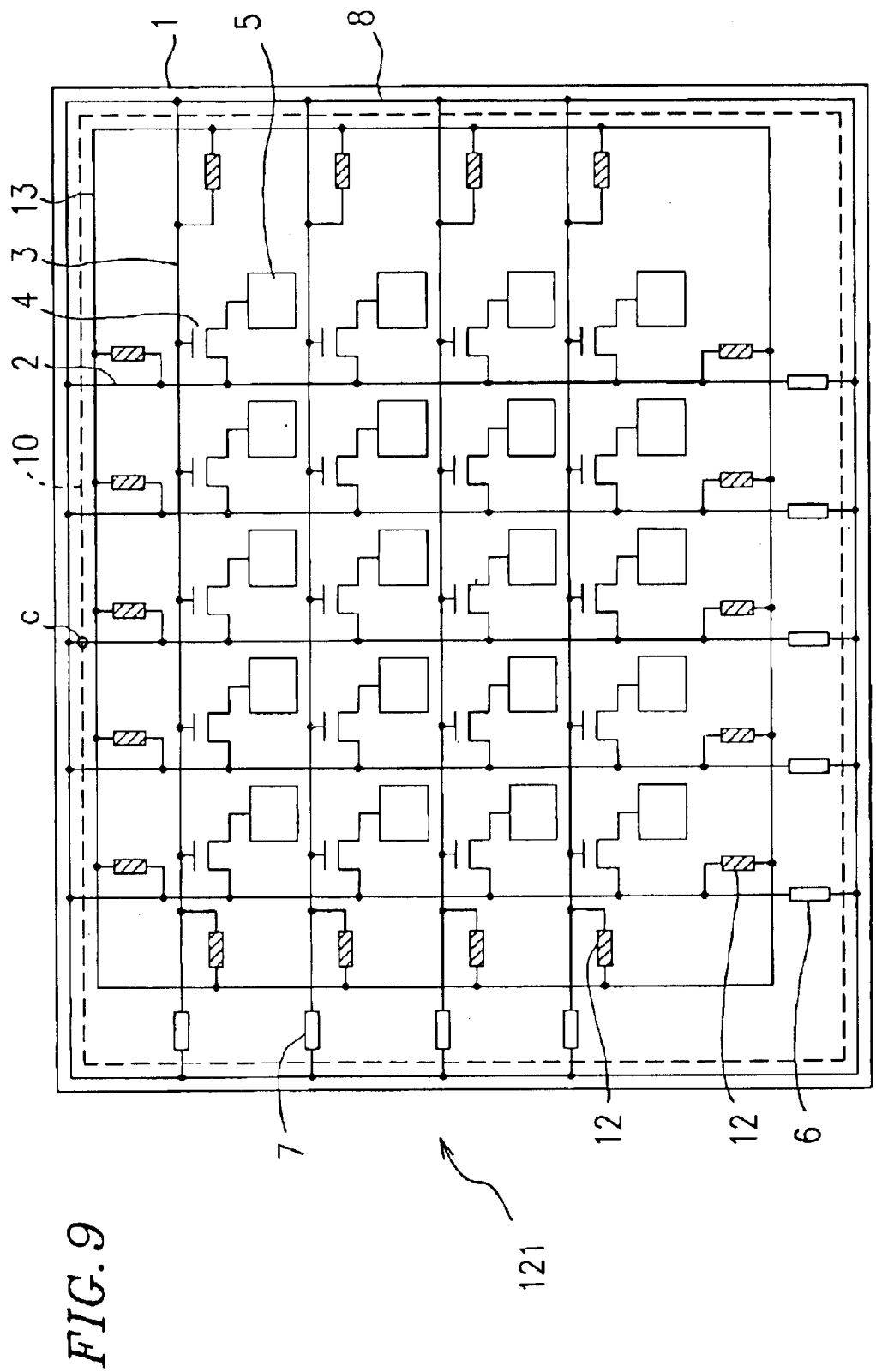
FIG. 9 is a diagram illustrating an equivalent circuit of still another conventional active matrix substrate.

Moreover, since the high resistance portions 9 are located closer to the substrate edge than the signal input terminals 6 and 7, the high resistance portions 9 do not influence signals applied to the signal input terminals 6 and 7 for actually driving the display panel. Furthermore, since the signal lines 2 and the scanning lines 3 are not connected to each other, unlike the conventional example illustrated in FIG. 9, leakage between lines due to an electrostatic charge applied to the elements 12 (see FIG. 9) which connects the lines to each other will not occur, and accordingly a display non-uniformity due to a slight leakage will not occur.

In the present example, the severance line 10 of the active matrix substrate 11 is positioned so as to remove the portion of the substrate 11 on which the high resistance portions 9 are provided. However, the severance line 10 may be at any other position so long as part or all of each of the high resistance portions 9 remains between the severed edge of the substrate 11 and the display region 20. In other words, the high resistance portions 9 may be completely interposed between the active matrix substrate 11 and the counter substrate, or interposed only partially between the active matrix substrate 11 and the counter substrate.

EXAMPLE 2

FIG. 3 is a partial enlarged view illustrating a display panel according to Example 2 of the present invention. The view of FIG. 3 corresponds to that of FIG. 2.

In the display panel of this example, the severance line 210 is positioned so as to cut off a portion of the short-circuiting line 8 which is connected to the high resistance portions 9 of the signal lines 2 and the scanning lines (not shown). After the substrate is severed, a portion 8a of the short-circuiting line 8 is left in the peripheral region of the active matrix substrate.

In the display panel, as in that of Example 1, all the signal lines 2 and the scanning lines 3 are connected to the short-circuiting line 8 via the high resistance portions 9 before the active matrix substrate is severed. Therefore, even when an electrostatic charge is generated, the applied electric charge is dispersed to all the lines via the high resistance portions 9 and the short-circuiting line 8, whereby the deterioration of the switching element characteristics and the insulation breakdown between the lines will not occur.

Moreover, during steps after the substrate is severed, the applied electrostatic charge is dispersed to the signal lines 2 and the scanning lines 3 via the portion of the short-circuiting line 8 remaining in the peripheral region of the active matrix substrate. Therefore, the voltage of the applied electrostatic charge is lowered by the high resistance portions 9 before it reaches the display region.

Thus, the present example is further effective in preventing the deterioration of the switching element characteristics and the insulation breakdown between the lines due to an electrostatic charge. In this case, however, the lines will be still connected together via the high resistance portions 9 and the portion 8a of the short-circuiting line 8 after the display panel is completed. Therefore, it is necessary to set the connection resistance between the adjacent signal lines (and the adjacent scanning lines) to a predetermined value so as not to influence a driving signal for actually driving the display panel.

EXAMPLE 3

FIG. 4 is a partial enlarged view illustrating a display panel according to Example 3 of the present invention. The view of FIG. 4 corresponds to that of FIG. 2.

After the substrate is severed, a portion 38a of the short-circuiting line 38 is left in the peripheral region of the active matrix-substrate. The portion 38a of the short-circuiting line 38 is connected to the end portions 2a of the signal lines 2 (or the end portions of the scanning lines 3) via the high resistance portions 9.

In this display panel, a neck 38b is provided in the short-circuiting line 38, and the severance line 10 is positioned so that the active matrix substrate is severed in the neck 38b of the short-circuiting line 38. After the substrate is severed, a portion of the neck 38b of the short-circuiting line 38 is left in the peripheral region of the active matrix substrate. The remaining portion of the neck 38b is electrically connected to a plurality of end portions 2a (three end portions 2a, in FIG. 4) of the signal lines 2 (and the end portions of the scanning lines 3) via the high resistance portions 9. In this case, the edge 32 of the counter substrate is preferably positioned to cover at least a portion of the neck 38b of the short-circuiting line 38.

In the display panel of Example 3, as in that of Example 1, all the signal lines 2 and the scanning lines 3 are connected to the short-circuiting line 38 via the high resistance portions 9 before the active matrix substrate is severed. Therefore, even when an electrostatic charge is generated, the electric charge is dispersed to all the lines via the high resistance portions 9 and the short-circuiting line 38, whereby the deterioration of the switching element characteristics and the insulation breakdown between the lines will not occur.

Moreover, during steps after the substrate is severed, the counter substrate covers at least a portion of the neck 38b of the short-circuiting line 38, whereby an electrostatic charge is applied only to the neck 38b (indicated at B in FIG. 4) after the substrate is severed. Therefore, it is possible to considerably reduce the problem caused by an electrostatic charge, as compared to Examples 1 and 2. In Examples 2 and 3, the influence of an electrostatic charge can be further reduced by connecting the portion 38a of the short-circuiting line 38 that is left on the panel after the severance to the counter electrode (not shown).

In Examples 1 to 3, a semiconductor film is used as the high resistance portions 9. However, any film, such as a metal film or a metal oxide film, can be used for this purpose as long as the film has a specific resistance higher than that of the signal line portion 2a or the scanning lines 3 in the display region 20 (see FIG. 1). When a metal film is used as the high resistance portions 9, it is preferable, for example, to reduce the thickness of the film or to increase the length to width ratio of the metal film so as to increase the resistance value of the high resistance portions 9. Furthermore, a metal oxide film may be used as the high resistance portions 9. When a semiconductor film, a metal film or a metal oxide film which forms the active matrix substrate is used for the high resistance portions 9, no additional production step is required, thereby reducing the production cost.

Moreover, in Examples 1 to 3, the short-circuiting line 8 and 38 is formed around the display region so as to connect to the high resistance portions 9 (provided at both ends of the signal lines 2 and the scanning lines 3). However, it is also possible to arrange the short-circuiting lines 8 and 38 in an L shape so as to connect to the high resistance portions 9 (provided at one end of the signal lines 2 and one end of the scanning lines 3). In such a case, the edge 32 of the counter substrate is preferably positioned so that the counter substrate completely covers the ends of the lines which are not connected to the short-circuiting lines 8 and 38, so that no electrostatic charge is applied to the signal lines 2 and the scanning lines 3 by physical contact, or the like, after the substrate is severed.

EXAMPLE 4

Figure 5:
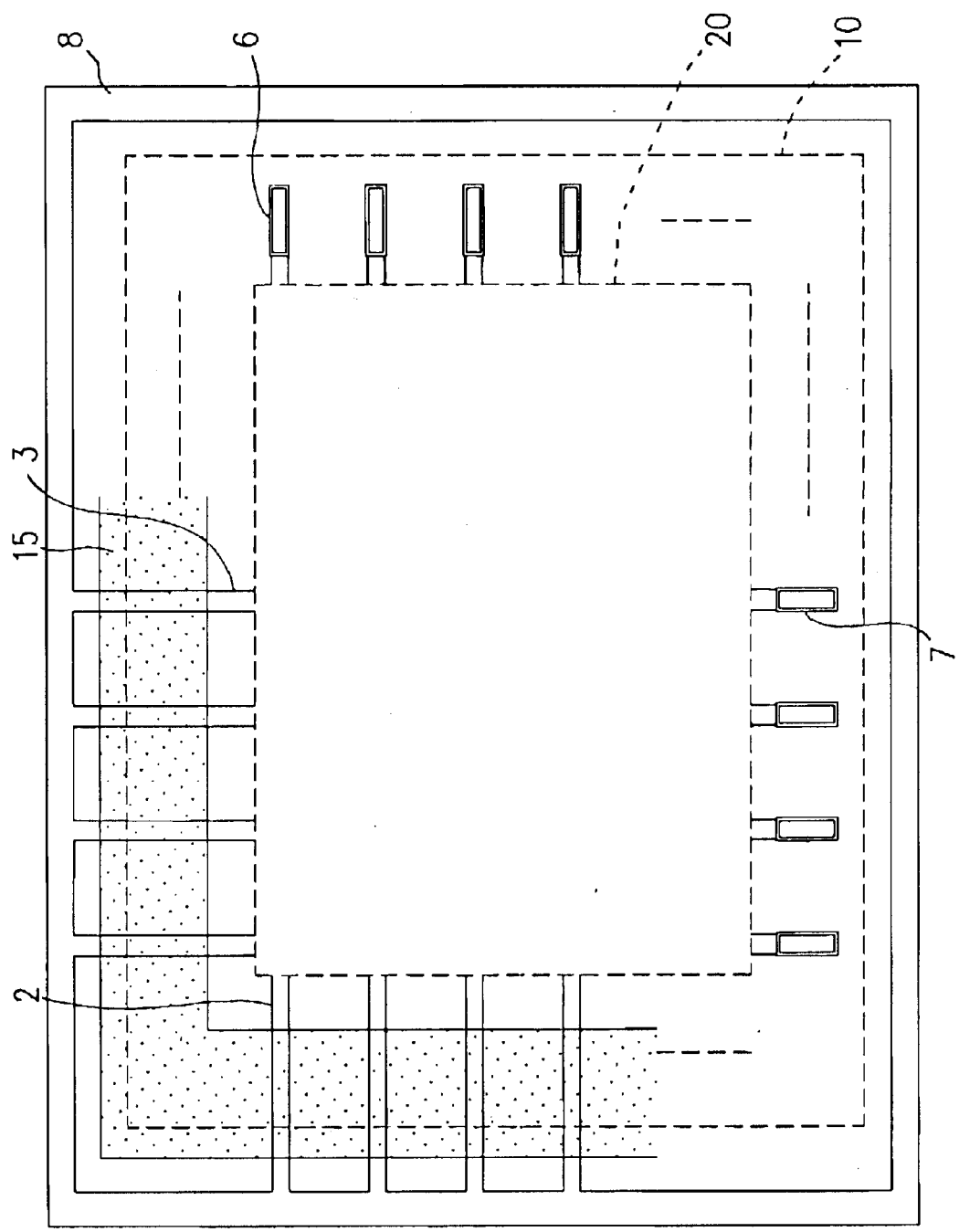
FIG. 5 is a plan view illustrating an active matrix substrate in a display panel according to Example 4 of the present invention.

FIG. 5 is a plan view illustrating an active matrix substrate 41 in a display panel according to Example 4 of the present invention. In FIG. 5, for simplicity, elements provided inside a display region 20 and some of the lines and terminals provided around the display region 20 are not shown.

In this active matrix substrate 41, the short-circuiting line 8 is connected to one end of each signal line 2 at which the signal input terminal 6 is not provided, and to one end of each scanning line 3 at which the signal input terminal 7 is not provided. Moreover, as shown in FIG. 5, a discharge-inducing electrode 15 is superimposed on the signal lines 2 and the scanning lines 3 via an insulation film (not shown) along two sides (e.g., the upper and the left sides, as in FIG. 5) of the substrate 41 along which the signal input terminals 6 or 7 are not provided.

After the active matrix substrate 41 is attached to a counter substrate (not shown) having counter electrodes provided thereon, the gap between the substrates is filled with a liquid crystal material, thereby completing the display panel. Before the display panel is completed, the substrate 41 is severed along the severance line 10 so as to remove the portion on which the short-circuiting line 8 is provided. Thus, after the severance, the ends of the signal lines 2 and the scanning lines 3 are covered with the discharge-inducing electrode 15 along the two sides of the substrate along which-the signal input terminals 6 or 7 are not provided.

Since the discharge-inducing electrode 15 covers the ends of the signal lines 2 and the scanning lines 3, as described above, most of the electrostatic charge discharged around the display panel is induced to the discharge-inducing electrode 15. The discharge-inducing electrode 15 is electrically insulated from the signal lines 2 and the scanning lines 3. Therefore, no voltage is applied to the TFT 4 formed at a location where the signal line 2 and the scanning line 3 cross each other, whereby the deterioration of the TFT characteristics and the insulation breakdown between the lines due to an electrostatic charge will not occur.

EXAMPLE 5

Figure 6:
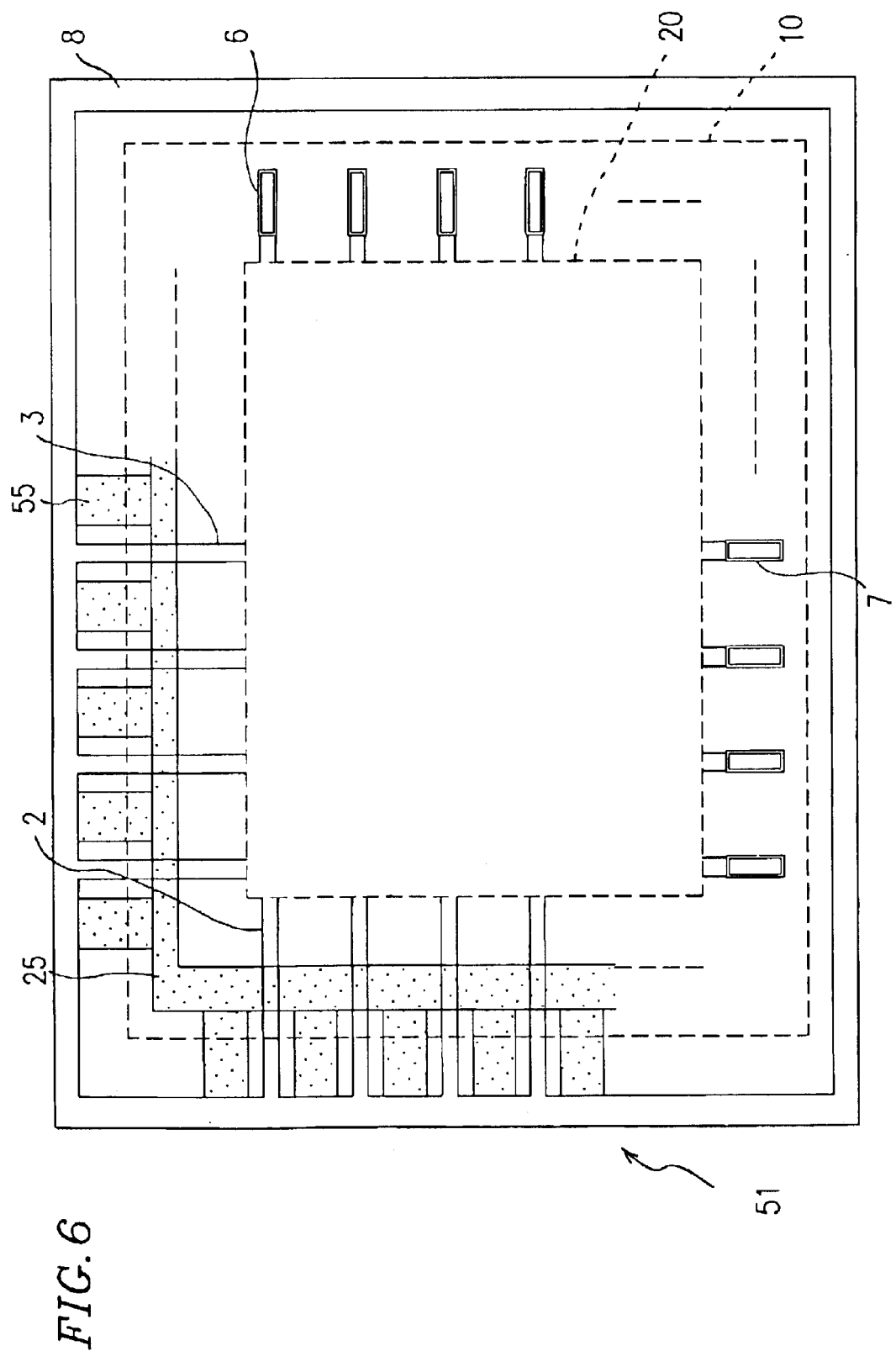
FIG. 6 is a plan view illustrating an active matrix substrate in a display panel according to Example 5 of the present invention.
Figure 7:
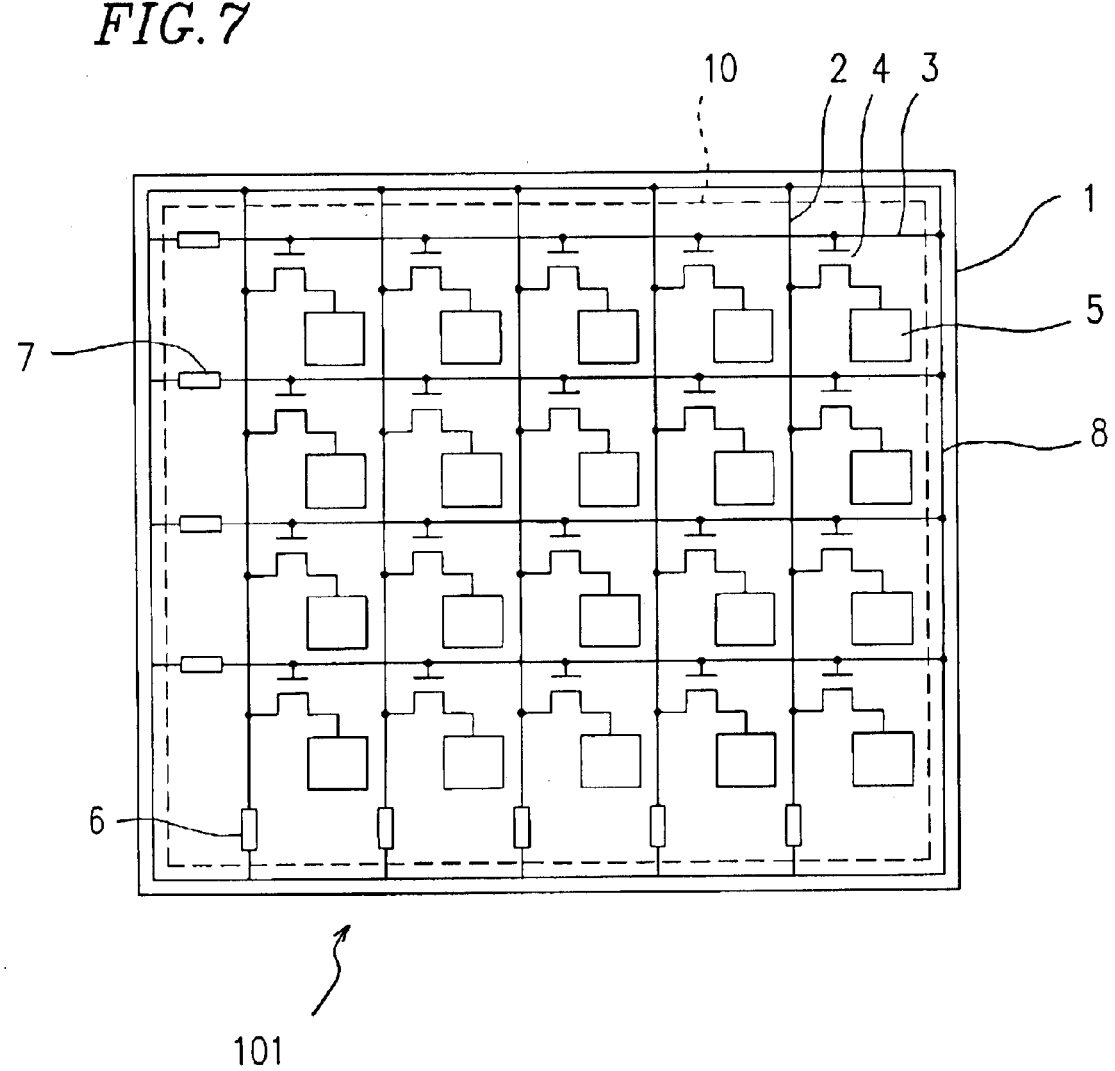
FIG. 7 is a diagram illustrating an equivalent circuit of a conventional active matrix substrate.
Figure 8:
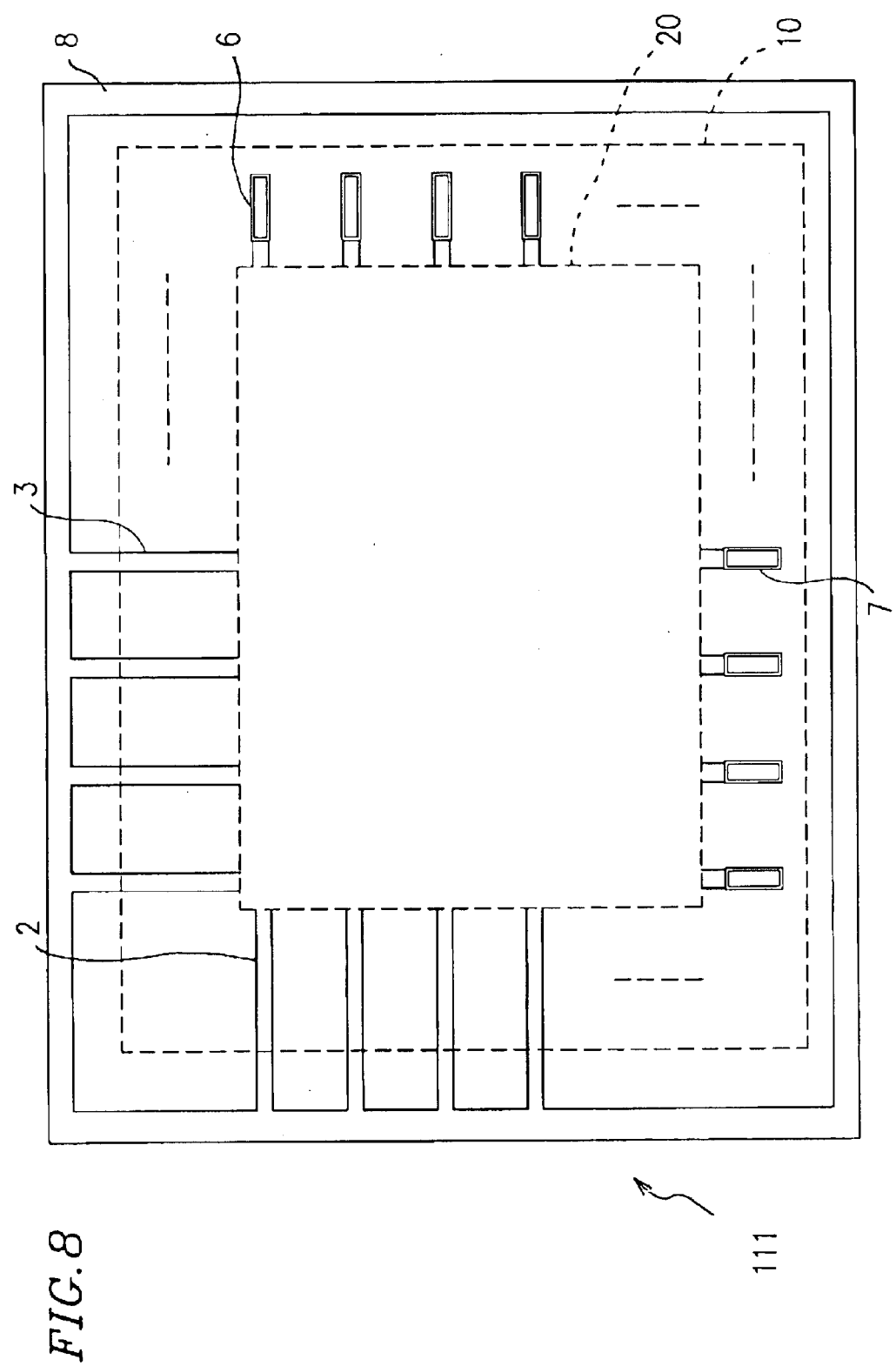
FIG. 8 is a diagram illustrating an equivalent circuit of another conventional active matrix substrate.

FIG. 6 is a plan view illustrating an active matrix substrate 51 in a display panel according to Example 5 of the present invention. In FIG. 6, for simplicity, elements provided inside a display region 20 and some of the lines and terminals provided around the display region 20 are not shown.

In this active matrix substrate 51, the short-circuiting line 8 is connected to one end of each signal line 2 at which the signal input terminal 6 is not provided and to one end of each scanning line 3 at which the signal input terminal 7 is not provided. Moreover, discharge-inducing electrodes 55 are provided on both sides of, and spaced apart (thus insulated)

from, each of the signal lines 2 and the scanning lines 3, along two sides (e.g., the upper and the left sides, as in FIG. 6) of the substrate 51 along which the signal input terminals 6 or 7 are not provided.

After the active matrix substrate 51 is attached to a counter substrate (not shown) having counter electrodes provided thereon, the gap between the substrates is filled with a liquid crystal material, thereby completing the display panel. Before the display panel is completed, the substrate 51 is severed along the severance line 10 so as to cut off the short-circuiting line 8. Thus, after severance, the ends of the signal lines 2 and the scanning lines 3 are each interposed by the discharge-inducing electrodes 55 along the two sides of the substrate 51 along which the signal input terminals 6 or 7 are not provided. The discharge-inducing electrodes 55 may be omitted on the outer side of the outermost signal lines 2 and scanning lines 3.

Since the discharge-inducing electrodes 55 interpose the ends of the signal lines 2 and the scanning lines 3 while the width of the discharge-inducing electrode 55 is wider than the width of the signal line 2 or the width of the scanning line 3, as described above, most of the electrostatic charge discharged around the display panel is induced to the discharge-inducing electrodes 55. The discharge-inducing electrodes 55 are electrically insulated from the signal lines 2 and the scanning lines 3. Therefore, no voltage is applied to the TFT 4 formed at a location where the signal line 2 and the scanning line 3 cross each other, whereby the deterioration of the TFT characteristics and the insulation breakdown between the lines due to an electrostatic charge will not occur.

Furthermore, in this display panel, the discharge-inducing electrodes 55 are connected to counter electrodes (not shown) via a common line 25, whereby a static electric charge can be dispersed to the entire liquid crystal display panel through the counter electrodes. Thus, the influence of an electrostatic charge can be further reduced.

The shape of the discharge-inducing electrode 15 and 55 is not limited to those illustrated in Examples 4 and 5. As long as the discharge-inducing electrode 15 and 55 is formed in the vicinity of the signal lines 2 and the scanning lines 3 using a conductive material, the discharge-inducing electrodes 15 and 55 may have any shape corresponding to the connection pattern between the signal lines 2 and the short-circuiting line 8 or the connection pattern between the scanning lines 3 and the short-circuiting line 8. Particularly, when the width or area of the discharge-inducing electrode 15 and 55 at the substrate edge is larger than the width or area of the lines 2 and 3 at the substrate edge, an electrostatic charge can be effectively induced to the discharge-inducing electrode 15 and 55. Moreover, when the discharge-inducing electrode 15 and 55 is formed by using the same material as the signal lines 2, the scanning lines 3 or the common line 25 (in the case of Example 5), no additional production step is required, thereby reducing the production cost.

As described in detail above, according to the present invention, the scanning line and/or the signal line has a high resistance portion proximate an end thereof outside the display region. The active matrix substrate is severed so that the high resistance portions may be completely interposed between the active matrix substrate and the counter substrate, or interposed only partially between the active matrix substrate and the counter substrate. Therefore, it is possible to prevent the deterioration of the switching element characteristics and the breakdown of the insulation film between the lines. As a result, it is possible to improve the production yield in all of the production steps before and after the substrate is severed, and to produce a reliable display panel.

Moreover, the resistance value of the high resistance portions is sufficiently higher than that of the signal lines and the scanning lines in the display region. Therefore, it is possible to conduct a test for detecting a disconnection of the lines, or for detecting a leakage between the lines, with the short-circuiting line still being connected to the signal lines and the scanning lines before the substrate is severed, thereby further improving the production yield.

Furthermore, the high resistance portions are located closer to the substrate edge than the signal input terminals. Thus, the high resistance portions do not influence a signal applied to the signal input terminals for actually driving the display panel, even with the high resistance portions remaining on the substrate after the display panel is completed. As a result, an image with a high display quality is obtained.

Since the high resistance portions can be formed by using the same material as that forming the active matrix substrate (e.g., a semiconductor film, a metal film or an oxide film), no additional production step is required, thereby reducing the production cost.

Moreover, according to an alternative example of the present invention, a discharge-inducing electrode is provided outside the display region in the vicinity of the end of either or both of the signal line and the scanning line. Therefore, even when an electrostatic charge is generated around the display panel after the display panel is completed, the electrostatic charge can be induced to the discharge-inducing electrode, whereby it is possible to prevent the electrostatic charge from being applied to the signal lines or the scanning lines. Thus, it is possible to prevent the deterioration of the switching element characteristics and the insulation breakdown between the lines due to the electrostatic charge.

Since the discharge-inducing electrode can be formed during the step of forming the signal line or the scanning line, no additional production step is required, thereby reducing the production cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A display panel comprising:
   a first substrate and a second substrate opposing each other with a display medium interposed therebetween;
   a plurality of bus lines provided on the first substrate to cross each other in a display region of the display panel and to be insulated from each other;
   a plurality of pixel electrodes each connected to one of the plurality of bus lines via a switching element, the pixel electrodes defining the display region of the display panel;
   a plurality of first electrodes provided outside the display region, for inducing electrostatic charge applied to the display panel to the plurality of first electrodes;
   wherein a first one of the plurality of first electrodes is interposed between, and spaced apart from, the ends of two adjacent ones of the plurality of bus lines, and a second one of the plurality of first electrodes is interposed between, and spaced apart from, the ends of two adjacent ones of the plurality of bus lines, and electrostatic charge is induced to the first electrodes; and wherein at least one of the first electrodes for inducing electrostatic charge runs substantially from an edge of the first substrate and runs between and substantially parallel to a pair of adjacent bus lines, wherein the at least one first electrode is connected to a shorting bar and insulated from the pair of bus lines.

2. A display panel according to claim 1, wherein the bus lines are signal lines.

3. A display panel according to claim 1, wherein the bus lines are scanning lines.

4. A display panel comprising:

a first substrate and a second substrate opposing each other with a display medium interposed therebetween;

a plurality of bus lines provided on the first substrate to cross each other in a display region of the display panel and to be insulated from each other;

a plurality of pixel electrodes each connected to one of the plurality of bus lines via a switching element, the pixel electrodes defining the display region of the display panel;

a plurality of first electrodes for inducing an electrostatic charge applied to the display panel provided outside the display region so that at least a portion of the plurality of first electrodes is in a vicinity of an edge of the first substrate and in a vicinity of an end of at least one of the plurality of bus lines, the plurality of first electrodes being insulated from the plurality of bus lines;

wherein a first one of the plurality of first electrodes is interposed between, and spaced apart from, two adjacent ones of the plurality of bus lines, and a second one of the plurality of first electrodes is interposed between, and spaced apart from, two adjacent ones of the plurality of bus lines so that each of the first and second ones of the first electrodes for inducing electrostatic charge runs substantially from an edge of the first substrate and runs between and substantially parallel to a pair of adjacent bus lines and is connected to a shorting bar and insulated from the pair of bus lines; and electrostatic charge is induced to the first electrodes.

5. A display panel according to claim 4, wherein the bus lines are signal lines.

6. A display panel according to claim 4, wherein the bus lines are scanning lines.

* * * * *